United States Patent [19]

Kearney et al.

[11] Patent Number: 4,526,846

[45] Date of Patent: Jul. 2, 1985

[54] CORROSION PREVENTION ADDITIVE

[75] Inventors: Susan D. Kearney, Brockton, Mass.; Peter R. Moses, Windham, N.H.

[73] Assignee: Duracell Inc., Bethel, Conn.

[21] Appl. No.: 387,738

[22] Filed: Jun. 14, 1982

[51] Int. Cl.$^3$ .................. H01M 6/14; H01M 6/16
[52] U.S. Cl. .................................. 429/194; 429/48; 429/197; 429/198
[58] Field of Search .............. 429/194, 197, 198, 48, 429/50; 548/317

[56] References Cited

U.S. PATENT DOCUMENTS

| | | | |
|---|---|---|---|
| 3,778,310 | 12/1973 | Garth | 429/197 |
| 4,084,045 | 4/1978 | Kegelman | 429/194 |
| 4,118,550 | 10/1978 | Koch | 429/197 |
| 4,327,166 | 4/1982 | Leger | 429/194 |
| 4,377,625 | 3/1983 | Parsen et al. | 429/198 |
| 4,390,604 | 6/1983 | Evans et al. | 429/197 |

OTHER PUBLICATIONS

*The Condensed Chemical Dictionary*, Ninth Edition, pp. 466 and 811.

*Primary Examiner*—Brian E. Hearn
*Assistant Examiner*—Stephen J. Kalafut
*Attorney, Agent, or Firm*—Ronald S. Cornell; Israel Nissenbaum

[57] ABSTRACT

Corrosion is prevented in a non-aqueous cell, having iron containing components kept at cathode potentials above 2.5 volts, by the inclusion within said cell of an additive comprised of a lewis base tertiary amine particularly heterocyclic imides such as 1,3-dimethylimidazolidinone and 3,5 dimethylisoxazole wherein all the nitrogens thereof contain no acidic protons.

13 Claims, No Drawings

CORROSION PREVENTION ADDITIVE

This invention relates to non-aqueous electrochemical cells having components therein which are corroded by other internal cell components and particularly to Li/MnO$_2$ cells suffering from such problem.

With the recent commercialization of Li/MnO$_2$ cells, various expedients have been utilized in making such cells more acceptable for widespread consumer applications. Thus, in U.S. Pat. No. 4,279,972 assigned to the same assignee as the present invention various alternative electrolyte salts and solvents are disclosed which, when utilized, significantly prevent detrimental gas evolution with resultant dimensional instability, even in cells not subjected to rigorous heat treatments. Electrolyte salts such as LiCF$_3$SO$_3$ (lithium trifluoromethanesulfonate-LiTFS) exhibiting such stability generally are commercially available at reasonable costs, are non-toxic and are rather inert chemically. This is in marked contrast to the currently utilized LiClO$_4$ electrolyte salt which while available at reasonable cost is considerably more chemically reactive. As a result, cells containing the LiTFS electrolyte salt are substantially more abuse resistant which is an important factor for general commercial or consumer applications.

However, while the cells containing the LiTFS salt exhibit good performance characteristics when discharged fresh, performance deteriorates rapidly when such cells are stored at elevated temperatures (>60° C.). Analysis of the stored cells indicates that at cathode potentials in excess of 2.5 volts such as in LiMnO$_2$ cells (OCV 3.25 volts and average load voltage of about 2.9 volts) the LiTFS accelerates a parasitic reaction with resultant lewis acid formation which causes corrosion of stainless steel or other iron containing cell components kept at cathode potential and to which corrosion the loss of cell performance is attributed.

It is an object of the present invention to provide a means whereby corrosion of stainless steel or other iron containing cell components in a high voltage non-aqueous electrochemical cell may be minimized or substantially prevented from occurring. This and other objects, features and advantages of the present invention will become more evident from the following discussion.

Generally the present invention comprises a non-aqueous electrochemical cell, having iron containing components kept at high cathode potentials, above about 2.5 volts which are thereby susceptible to corrosion, to which cell a lewis base tertiary amine material is added. The tertiary amine, as opposed to the amines added to aqueous cells as described in U.S. Pat. No. 3,057,944, contains no N—H bonds which because of their acidic nature would react with the active anode materials such as lithium. Additionally the amine is not a charged material such as quaternary amines such as the tetra alkyl onium salts described in U.S. Pat. No. 4,160,070. It is believed that the lewis base tertiary amine additives of the present invention either neutralize the generated lewis acid corroding materials or act to absorb such corroding products prior to occurrence of any substantial corrosion. Charged materials such as the above mentioned quaternary ammonium salts do not however function in such a manner.

Particular examples of tertiary amines useful as the additives in the cells of the present invention include the alkyl, alkyl aryl, heterocyclic (imides) particularly the imidazole tertiary amines. The preferred tertiary amines are the heterocyclic amines or imides particularly imidazoles such as 3,5 dimethylisoxazole

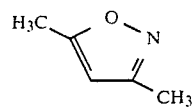

and 1,3-dimethylimidazolidinone (DMI)

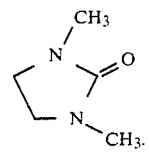

The additives of the present invention are lewis base organic nitrogen containing compounds which are generally compatible with the components of non-aqueous cells such as lithium anodes and other alkali and alkaline earth metals which comprise the anodes of non-aqueous cells and those of the present invention.

The additives are included within the cell by dissolution of between 0.1%–10% (by weight of the electrolyte) of the additive into the electrolyte. Preferably such inclusions range from about 0.5% to 5%. Cathodes for the non-aqueous cells include the aforemetioned MnO$_2$ as well as other metal oxides, halides, chalcogenides, carbon fluorides, and sulfides and the like which are cathode active materials and which provide high cell potentials in excess of 2.5 volts whereby corrosion becomes a problem. Other cathodes include the fluid cathode depolarizers such as SO$_2$ and SOCl$_2$, with average load voltages of 2.9 and 3.6 respectively in Li anode cells which are reduced on inert cathode substrates such as of metal or carbon. Materials such as MnO$_2$ further have open circuit voltages above 3.0 volts (3.25 for MnO$_2$) whereby corrosion is still further accelerated even when the cell is stored and is not in use.

U.S. Pat. Nos. 4,301,220 and 4,302,520 describe cells having 3-methyl-2-oxazolidinone and dimethylisoxazole contained therein. However, they are utilized as electrolyte co-solvents in cells not subject to corrosion because of the low cathode potentials thereof generally averaging less than 2 volts with the dimethylisoxazole being included in small amounts to prevent polymerization of the dioxolane cosolvent.

The iron containing components susceptible to corrosion in the cells of the present invention are those kept at the high cathode potentials whereby corrosion is accelerated by such potential. Generally such components are terminals for the cathode, current collectors and the cell container itself which have, in the past, been comprised of materials such as stainless steel.

The non-aqueous electrolyte salts useful in the cells of the present invention include the aforementioned LiTFS which seems to accelerate corrosion. However, the additives of the present invention also are generally effective in preventing corrosion of iron containing cell components in cells containing other salts such as the LiClO$_4$ commonly utilized in Li/MnO$_2$ cells and other salts such as LiCF$_3$CO$_2$, LiBr, LiBF$_4$, LiPF$_6$, LiAsF$_6$, LiGaCl$_4$, LiAlCl$_4$ and the like commonly used in lithium cells.

The electrolyte solvents utilized in the present invention include the inorganic solvents such as SO$_2$ and $SOCl_2$ and the organic solvents commonly utilized in non-aqueous cells such as the propylene carbonate (PC), dimethoxyethane (DME), and dioxolane (DO) solvents commonly utilized in $Li/MnO_2$ cells as well as acetonitrile, gamma-butyrolactone, tetrahydrofuran etc.

In order to illustrate the efficacy of the present invention the following examples are presented. It is understood that such examples are for illustrative purposes only and that details contained therein should not be construed as limitations on the present invention. Unless otherwise indicated all parts are parts by weight.

EXAMPLE I

A corrosion test cell was assembled comprising a piece of 304-stainless steel expanded metal and a piece of lithium foil immersed in about 20 ml of 0.75M LiTFS in 1:1 PC/DME solvents. The cell was heated to 85° C. and a potential of +3.25 V vs the lithium foil was applied to the expanded metal grid. After about 1 hour the corrosion current on the grid was about 100 mA. Subsequently an amount of DMI was injected into the cell to bring the concentration of DMI to about 5%. The corrosion current dropped to about 20 $\mu A$ within 10 minutes and dropped to about 8 $\mu A$ after 5 hours.

EXAMPLES II AND III

Two additional corrosion test cells A and B, were assembled. Cell A was used as a control and was identical to the cell in Example I. Cell B was the same but with the electrolyte containing 1% added DMI. The corrosion current of the expanded metal grids was measured as a function of temperature at +3.25 V vs Li with the results given in the following table.

TABLE

| T, °C. | Corrosion Current, $\mu A$ | |
|---|---|---|
| | Cell A (Control) | Cell B (1% DMI) |
| 60 | 750 | 0.076 |
| 70 | 1100 | 0.11 |
| 80 | 1800 | 0.17 |
| 90 | 3000 | 0.35 |

EXAMPLE IV (Prior Art)

A group of twenty cells was constructed with each having about 64 mg lithium anodes, 820 mg $MnO_2$ cathodes and about 0.35 ml of 0.35 ml of 0.75M LiTFS in 1:1 (volume) PC/DME electrolyte within a cylindrical cell container 1.16 cm diameter × 1.08 cm height. The cells were then stored at 60° C. for one month and then discharged at 2.67 k$\Omega$ with an average voltage of about 2.9 volts and a discharge capacity of about 148 mAhrs to 2.0 volts.

EXAMPLE V

Twenty cells, identical to those in Example IV, were constructed but with each having 1.0% DMI in the electrolyte. After being stored and discharged in the same manner, the average discharge capacity of the cells was about 183 mAhrs to 2.0 volts and an average discharge voltage of about 2.9 volts. This capacity was similar to that obtained with cells discharged fresh with the same load of 2.67 k$\Omega$.

It is readily apparent from the above examples that the inclusion of additive amounts of the DMI tertiary amine of the present invention almost immediately halts the corrosion process and substantially increases the capacity of cells stored at high temperatures.

It is understood that the above examples are illustrative in nature and are not to be considered as limitations on the present invention since changes in cell composition and structure may be made without departing from the scope of the present invention as defined in the following claims.

What is claimed is:

1. A non-aqueous electrochemical cell comprising an alkali or alkaline earth metal anode, an electrolyte comprised of an electrolyte salt dissolved in a non-aqueous electrolyte solvent, a cathode comprised of a material which provides a potential above 2.5 volts and one or more iron containing components, normally subject to accelerated corrosion caused by said electrolyte salt dissolved in said solvent, kept at cathode potentials above 2.5 volts, characterized in that said cell further contains a corrosion inhibiting additive, dissolved in said electrolyte, comprised of a tertiary amine having no acidic protons in an amount ranging between 0.1% to 10% by weight of said electrolyte.

2. The cell of claim 1 wherein said tertiary amine is an heterocyclic imide.

3. The cell of claim 2 wherein said heterocyclic imide is an imidazole.

4. The cell of claim 3 wherein said imidazole is selected from the group comprising 1,3-dimethylimidazolidinone and 3,5 dimethylisoxazole.

5. The cell of claim 4 wherein said anode is comprised of lithium.

6. The cell of claims 3, 4 or 5 wherein said electrolyte salt is comprised of lithium trifluoromethanesulfonate.

7. The cell of claim 6 wherein said cathode is comprised of $MnO_2$.

8. A non-aqueous electrochemical cell comprising a lithium anode, an $MnO_2$ cathode said cathode providing a potential in excess of 2.5 volts, and a non-aqueous electrolyte comprised of an organic electrolyte having lithium trifluoromethanesulfonate dissolved therein contained within a container comprised of iron wherein said container is electrically connected to said cathode characterized in that said cell contains a 1,3-dimethylimidazolidinone additive dissolved in said electrolyte and comprises between 0.1% to 10% by weight thereof.

9. The cell of claim 8 wherein said organic electrolyte is comprised of a member of the group consisting of propylene carbonate, dimethoxyethane, dioxolane and mixtures thereof.

10. A method for preventing corrosion of iron containing components in a non-aqueous electrochemical cell wherein said components are kept at cathode potentials above 2.5 volts and wherein said cell contains an electrolyte comprised of an electrolyte salt dissolved in a non-aqueous solvent which accelerates said corrosion, said method comprising the step of dissolving an additive, comprised of a tertiary amine having no acidic protons, in the electrolyte of said cell in an amount of between 0.1% to 10% by weight of said electrolyte.

11. The method of claim 10 wherein said tertiary amine is an heterocyclic imide.

12. The method of claim 11 wherein said heterocyclic imide is an imidazole.

13. The method of claim 12 wherein said imidazole is selected from the group consisting of 1,3-dimethylimidazolidinone and 3,5 dimethylisoxazole.

* * * * *